United States Patent
Shimamura et al.

(10) Patent No.: US 10,728,408 B2
(45) Date of Patent: Jul. 28, 2020

(54) INFORMATION PROCESSING APPARATUS HAVING AT LEAST ONE INTERFACE FOR ELECTRIC POWER TRANSFER, METHOD OF CONTROLLING INFORMATION PROCESSING APPARATUS TO TRANSFER ELECTRIC POWER TO AN EXTERNAL DEVICE, AND NON-TRANSITORY COMPUTER-READABLE MEDIUM THEREFOR

(71) Applicant: BROTHER KOGYO KABUSHIKI KAISHA, Nagoya-shi, Aichi-ken (JP)

(72) Inventors: Yasuhiro Shimamura, Nagoya (JP); Hajime Usami, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 16/261,652

(22) Filed: Jan. 30, 2019

(65) Prior Publication Data

US 2019/0238705 A1 Aug. 1, 2019

(30) Foreign Application Priority Data

Jan. 31, 2018 (JP) .................................. 2018-014791

(51) Int. Cl.
| | |
|---|---|
| G06F 3/12 | (2006.01) |
| H04N 1/00 | (2006.01) |
| H02J 7/00 | (2006.01) |
| G06F 1/28 | (2006.01) |
| G06F 1/26 | (2006.01) |

(52) U.S. Cl.
CPC ......... *H04N 1/00888* (2013.01); *G06F 1/266* (2013.01); *G06F 1/28* (2013.01); *H02J 7/0068* (2013.01); *H04N 1/00907* (2013.01); *H04N 2201/0072* (2013.01)

(58) Field of Classification Search
CPC ........... H04N 1/00888; H04N 1/00907; H04N 2201/0072; G06F 1/266; G06F 1/28; H02J 7/0068
USPC .................................................. 358/1.1–1.18
See application file for complete search history.

(56) References Cited

U.S. PATENT DOCUMENTS

| | | | | |
|---|---|---|---|---|
| 2014/0365695 | A1* | 12/2014 | Peng ..................... | G06F 13/385 710/110 |
| 2015/0346794 | A1* | 12/2015 | Sakashita ................ | G06F 1/266 713/310 |
| 2019/0199884 | A1* | 6/2019 | Shimamura ........ | H04N 1/00965 |
| 2019/0238052 | A1* | 8/2019 | Lorin ...................... | H02M 3/07 |

FOREIGN PATENT DOCUMENTS

JP 2015-174373 A 10/2015

* cited by examiner

*Primary Examiner* — Gabriel I Garcia
(74) *Attorney, Agent, or Firm* — Scully Scott Murphy and Presser

(57) ABSTRACT

A CPU of an MFP receives battery information from a first external device via a first interface, determines whether a total amount of electric power supplied to a plurality of interfaces from a power supply is maintained, and reduces an amount of the electric power supplied to the first external device via the first interface in a case where determining that the first external device has no battery based on the battery information in response to determining that the total amount of the electric power supplied to the plurality of the interfaces from the power supply is not maintained.

17 Claims, 4 Drawing Sheets

FIG. 4

RESIDUAL AMOUNT
INFORMATION

| NO  | VENDOR ID | PRODUCT ID | BATTERY CHARGED LEVEL | JOB RECEPTION INFORMATION | SUPPLY POWER | CONNECTION PORT |
|-----|-----------|------------|-----------------------|---------------------------|--------------|-----------------|
| NO1 | 0x5542    | 0x0A17     | 50%                   | RECEIVED                  | 20W          | USB PORT 1      |
| NO2 | 0x7755    | 0x05B2     | 60%                   | NOT RECEIVED              | 12W          | USB PORT 3      |
| NO3 | 0x2525    | 0x0882     | 70%                   | NOT RECEIVED              | 12W          | USB PORT 4      |

INFORMATION PROCESSING APPARATUS HAVING AT LEAST ONE INTERFACE FOR ELECTRIC POWER TRANSFER, METHOD OF CONTROLLING INFORMATION PROCESSING APPARATUS TO TRANSFER ELECTRIC POWER TO AN EXTERNAL DEVICE, AND NON-TRANSITORY COMPUTER-READABLE MEDIUM THEREFOR

CROSS-REFERENCE TO RELATED APPLICATION

This application claims priority from Japanese Patent Application No. 2018-014791 filed on Jan. 31, 2018, the entire subject-matter of which is incorporated herein by reference.

TECHNICAL FIELD

The present disclosure relates to an information processing apparatus which supplies electric power to an external device via a USB connecting unit, a method of controlling the information processing apparatus, and a non-transitory computer-readable recording medium.

BACKGROUND

There has been an information processing apparatus that supplies electric power to an external device (for example, JP-A-2015-174373). The information processing apparatus disclosed in JP-A-2015-174373 supplies electric power to an external device according to the USB Power Delivery (USB PD) standard.

In an information processing apparatus, there is a possibility that supply power is not sufficiently secured when power consumption increases due to the start of information processing during the supply of electric power to an external device connected according to the USB PD standard. The information processing apparatus needs to reduce the supply power to secure electric power. On the other hand, a power supply configuration of an external device, such as existence of an AC power circuit or existence of a battery, depends on the device. Therefore, a degree of the need to supply electric power is different upon each external device.

SUMMARY

An object of the present disclosure is to provide an information processing apparatus capable of controlling the electric power amount of supply power to be supplied via an interface according to characteristics or a state of an external device, a method of controlling the information processing apparatus, and a non-transitory computer-readable recording medium therefor.

An information processing apparatus according to the present disclosure includes a power supply, a plurality of interfaces including a first interface, and a controller. The controller receives first battery information from a first external device via the first interface, determines whether a total amount of electric power supplied to the plurality of the interfaces from the power supply is maintained, and in response to determining that the total amount of the electric power supplied to the plurality of the interfaces from the power supply is not maintained, reduces an amount of the electric power supplied to the first external device via the first interface in a case where determining that the first external devices has no battery based on the first battery information. The "reduction of an amount of the electric power" is a concept including both the reduction of the electric power amount and the complete stoppage of the supply of electric power.

An information processing apparatus according to the present disclosure includes a power supply, a plurality of interfaces including a first interface, and a controller. The controller receives first battery information from a first external device via the first interface, determines whether a total amount of electric power supplied to the plurality of the interfaces from the power supply is maintained, and in response to determining that the total amount of the electric power supplied to the plurality of the interfaces from the power supply is not maintained, reduces an amount of the electric power supplied to the first external device via the first interface in a case where determining that the first external device has a battery and is not charging the battery based on the first battery information.

The determination includes for example a determination by the controller whether the total amount of electric power supplied to the plurality of the interfaces is maintained and a determination by the information processing apparatus whether the total amount of electric power supplied to the interfaces is maintained.

An information processing apparatus according to the present disclosure includes a power supply, an interface, and a controller. The controller receives battery information from an external device via the interface, and in response to detecting power shortage of the power supply, reduces an amount of the electric power supplied to the external device via the interface in a case where determining that the external device has a battery and is not charging the battery based on the battery information.

The disclosure of the present application can be implemented not only as an information processing apparatus but also as a method of controlling the information processing apparatus, and a non-transitory computer-readable recording medium storing computer-readable instructions for the information processing apparatus.

According to the present disclosure, in the case where the total amount of electric power supplied to the external devices is not be maintained, the controller reduces electric power supplied to the external device having no battery. There is a possibility that an external device having a battery as a power supply is driven by the battery and charges the battery. Thus, there is a high possibility for the external device having a battery to require more electric power than an external device having no battery. Accordingly, the controller can reduce the amount of electric power to be supplied via the interface by reducing the electric power supplied to the external device having no battery.

According to an information processing apparatus of the present application, the amount of electric power to be supplied via an interface can be controlled according to characteristics or a state of the external device.

BRIEF DESCRIPTION OF DRAWINGS

FIG. 4 is a diagram illustrating residual amount information.

DETAILED DESCRIPTION

Hereinafter, an MFP 1 which is an embodiment embodied an information processing apparatus of the present application will be described with reference to FIG. 1.

(1. Structure of MFP)

Figure 1:
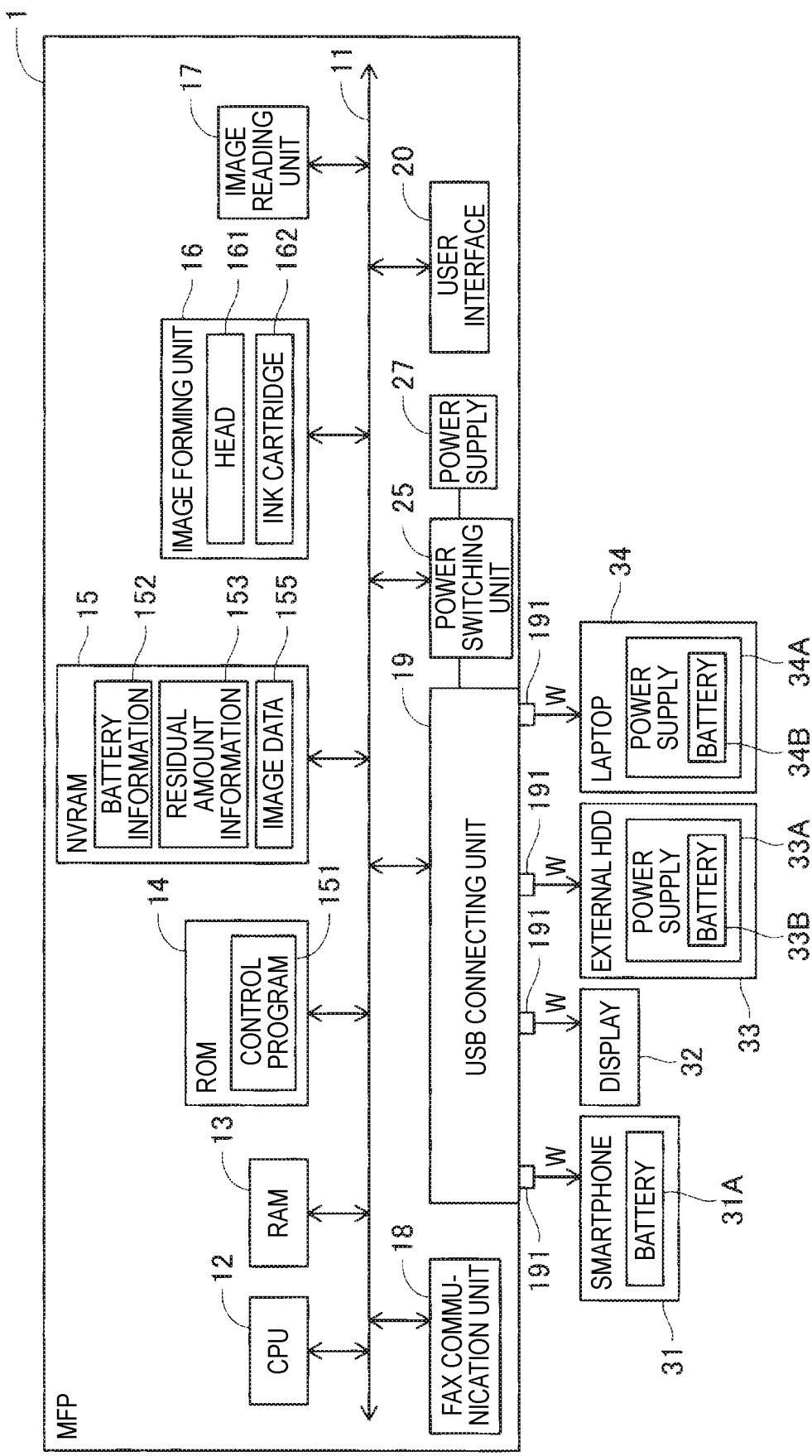
FIG. 1 is a block diagram illustrating an electrical configuration of an MFP according to an embodiment.

FIG. 1 illustrates an electrical configuration of a multifunction peripheral (MFP) 1 according to the present embodiment. The MFP 1 is a multi-function peripheral having a printing function, a copying function, a scanner function, and a FAX function. As illustrated in FIG. 1, the MFP 1 includes a CPU 12, a RAM 13, a ROM 14, a NVRAM 15, an image forming unit 16 that is an example of a print engine, an image reading unit 17 that is an example of a scan engine, a FAX communication unit 18, a USB connecting unit 19, a user interface 20, a power switching unit 25, and the like. The CPU 12 and the like are connected to each other via a bus 11. The MFP 1 further includes a power supply 27 that receives electric power from the commercial power supply. The power supply 27 includes a power supply cord and a power supply circuit (a bridge diode, a smoothing circuit, and the like), and generates DC power from the commercial power supply to supply the electric power to each of the components of the MFP 1 via a power supply line.

The ROM 14 is, for example, a nonvolatile memory such as a flash memory, and stores various programs such as a control program 151. For example, the CPU 12 starts a system of the MFP 1 by executing the control program 151 read from the ROM 14. Battery information 152, residual amount information 153, and image data 155 are stored in the NVRAM 15. The above destination storing the data is a merely example. For example, the control program 151 may be stored in the NVRAM 15.

The control program 151 is, for example, firmware for overall control of each of the components of the MFP 1. The CPU 12 controls each component connected via the bus 11 while temporarily storing in the RAM 13 a result of performing a job through execution of the control program 151. As will be described below, the battery information 152 is information indicating whether an external device connected to the USB connecting unit 19 has a battery, and information indicating a battery usage state. As will be described below, the residual amount information 153 is information associating battery charged levels of a plurality of external devices connected to the USB connecting unit 19 with identification information of the plurality of external devices. The image data 155 is image data formed by reading a document with a copying function, a FAX function, or the like, image data related to a print job received from an external device, or the like.

The image forming unit 16 includes a head 161 and an ink cartridge 162. The ink cartridge 162 contains ink for printing. The head 161 ejects the ink supplied from the ink cartridge 162 on a sheet (paper, OHP, or the like). Thus, the image forming unit 16 prints an image on a sheet by an inkjet method, under the control of the CPU 12. The image reading unit 17 includes a document table and a contact image sensor (CIS), which are not illustrated. The image reading unit 17 reads a document by moving the CIS to the document placed on the document table to generate the image data 155. The FAX communication unit 18 transmits FAX data to or receives FAX data from another facsimile device via a telephone line.

The USB connecting unit 19 is, for example, an interface to perform communications according to the USB power delivery (USB PD) standard and to supply or receive electric power. The USB connecting unit 19 includes, for example, four receptacles 191 as connecting units. The receptacles 191 and are an example of a USB interface, and are connecting units according to, for example, the USB Type-C standard. Each of the receptacles 191 includes, for example, a plurality of pins to perform data communications and to supply or receive electric power. The receptacle 191 includes a D+ pin, a D− pin, a Vbus pin, and the like as the plurality of pins in a connector according to the USB Type-C standard. The receptacle 191 performs data communications using the D+ pin and the D− pin. In addition, the receptacle 191 uses the Vbus pin to supply electric power and to receive electric power. A CC pin is used to perform negotiation to supply or receive electric power. Here, the negotiation for the supply or reception of electric power refers to, for example, a process of setting whether to be a power source which is a power supply source or a power sink which is a power supply destination, setting an amount of electric power to be supplied, and the like.

The USB connecting unit 19 is connected to the power supply 27 via the power switching unit 25. The power switching unit 25 is a so-called PD controller, and changes supply power W to be supplied to an external device, for example, from the USB connecting unit 19 via the Vbus pin. The power supply 27 supplies electric power obtained by combining a plurality of voltage values and a plurality of current values to the power switching unit 25. The plurality of voltage values are, for example, 5 V, 12 V, and 20 V. The plurality of current values are, for example, 0.5 A, 1 A, 2 A, and 3 A. In this case, a combination providing a maximum amount of electric power among the plurality of combinations is 60 W (=20 V×3 A). Alternatively, a combination providing the minimum amount of electric power among the plurality of combinations is 2.5 W (=5 V×0.5 A). The CPU 12 controls the power switching unit 25 through execution of the control program 151. Under the control of the CPU 12, the power switching unit 25 supplies electric power, which is obtained from a predetermined combination of voltage values and current values among the plurality of combinations, as the supply power W to an external device via the USB connecting unit 19. In this way, a voltage value or a current value of the supply power W supplied to the external device from each of the receptacle 191 of the USB connecting unit 19 is changed.

Alternatively, the CPU 12 and the power switching unit 25 may not be configured as separate processing circuits, and may be configured as one processing circuit. The supply power W supplied from the USB connecting unit 19 may be controlled through control of the power switching unit 25 by the CPU 12, or may be controlled directly by the power switching unit 25. For example, the negotiation for the supply or reception of electric power described above may be performed by either the CPU 12 or the power switching unit 25. In addition, the power switching unit 25 is not limited to a configuration that supplies the supply power W by combining specific voltage values and current values, and may be configured to control the power supply 27 to generate the supply power W having a desired voltage value and current value.

In addition, the USB connecting unit 19 performs data communications with and supplies electric power to or receives electric power from various external devices connected to the receptacles 191. As the external devices, various types of devices, which can be connected according to the USB PD standard, such as a smartphone, a display, an external hard disk, a personal computer, or a card reader can be employed. For example, as illustrated in FIG. 1, a smartphone 31, a display 32, an external hard disk 33, and a laptop 34 are respectively connected to the four receptacles 191. The smartphone 31 includes a battery 31A. The external hard disk 33 includes a power supply 33A. The laptop 34 includes a power supply 34A. The power supplies 33A and 34A include, for example, a device (an AC adapter, a power supply circuit or the like) for receiving electric power from a commercial power supply, and batteries 33B and 34B for accumulating the received electric power. In addition, the smartphone 31, the external hard disk 33, and the laptop 34 can charge the batteries 31A, 33B, and 34B by receiving the supply power W from the MFP 1 via the USB connecting unit 19. Therefore, the smartphone 31, the external hard disk 33, and the laptop 34 as the external devices of the present embodiment include the batteries 31A, 33B, and 34B that can be charged with the supply power W supplied from the MFP 1 via the USB connecting unit 19. The battery 31A and the like are, for example, nickel hydrogen batteries. Alternatively, the battery 31A and the like are not limited to the nickel hydrogen batteries, and may be other types of rechargeable batteries such as a lithium ion battery.

The receptacle 191 connected to the display 32 corresponds a first interface, whereas the receptacles 191 connected to the smartphone 31, the external hard disk 33, and the laptop 34 correspond to a second interface, for example.

The user interface 20 includes, for example, a touch panel, a numeric keypad, or the like (not illustrated). Under the control of the CPU 12, the user interface 20 displays various setting screens and device operation states on the touch panel. Furthermore, the user interface 20 outputs manipulation, which is input using the touch panel, the numeric keypad, or the like in the form of a signal to the CPU 12.

(2. Power Amount Control)

Figure 2:
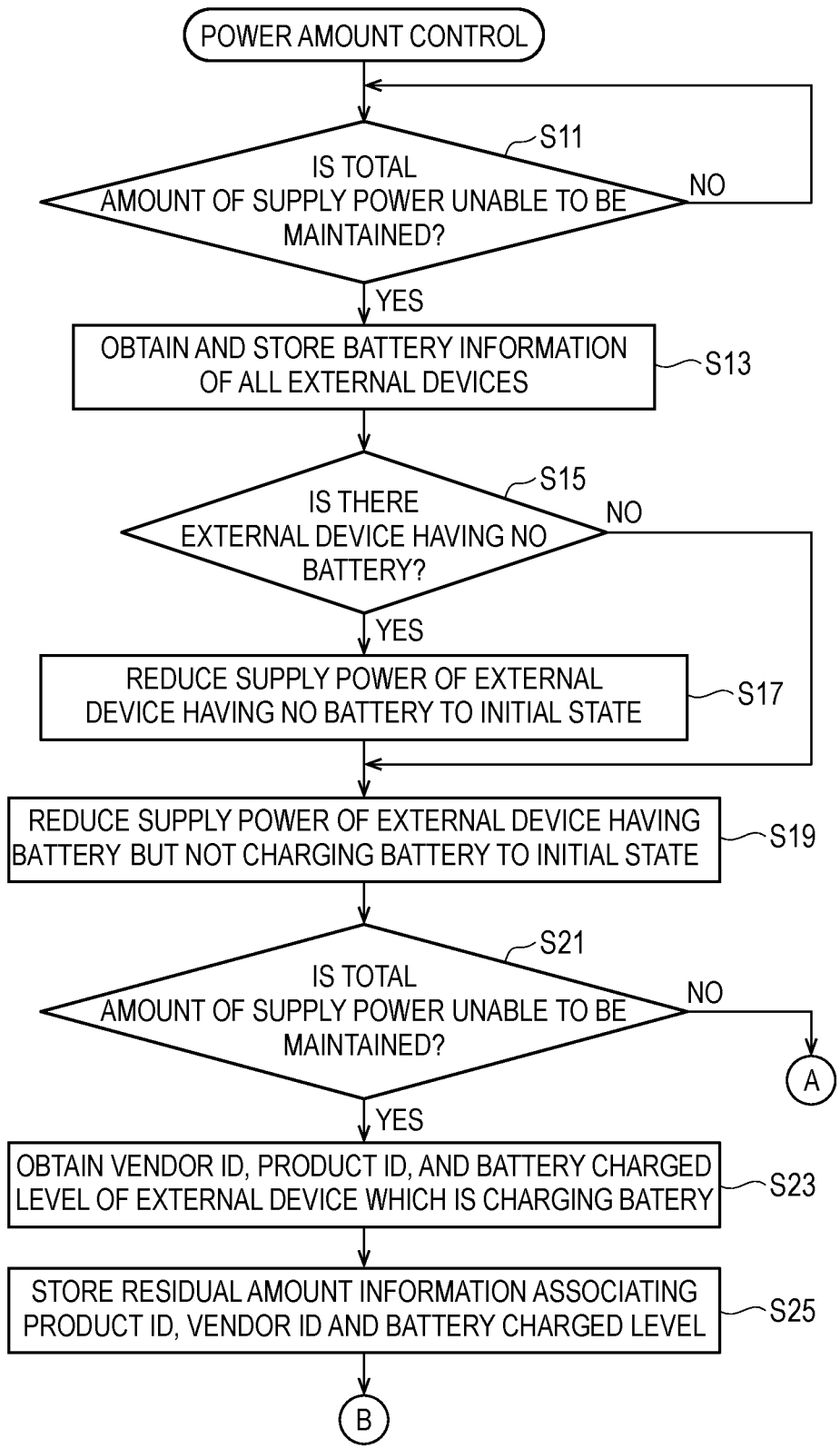
FIG. 2 is a flowchart illustrating the content of a power amount control process.

Next, power amount control performed to control the amount of electric power to be supplied to an external device from the USB connecting unit 19 by the MFP 1 will be described with reference to FIGS. 2 and 3. In the following description, the CPU 12 that executes the control program 151 may be referred to simply as the CPU 12. For example, a description "the CPU 12 supplies electric power to an external device" may mean "the CPU 12 executing the control program 151 controls the power switching unit 25 to supply electric power to the external device from the USB connecting unit 19".

For example, when the MFP 1 is powered on, the CPU 12 starts the system of the MFP 1 by executing the control program 151 stored in the ROM 14. When the system is started, the CPU 12 performs negotiation to supply electric power to or receive electric power from an external device (the smartphone 31 or the like) connected to the USB connecting unit 19. The CPU 12 performs the negotiation by performing communications with the external device via the USB connecting unit 19 according to the USB PD standard.

For example, the CPU 12 performs negotiation with the external device to set the MFP 1, that is, its own device, as a power source. In the control program 151 of the present embodiment, an initial value of the supply power W supplied to the external device is set to a minimum power level (2.5 W). Thus, after the MFP 1 is set as the power source, when an amount of the supply power W is not specified by the external device serving as a power sink or a request to increase the supply power W is not received from the external device, the supply power W which is a minimum power level is supplied to the external device as an initial state. When the amount of the supply power W is specified by the external device or a request of increase the supply power W is received from the external device, the CPU 12 controls the power switching unit 25 (see FIG. 1) to supply the specified supply power W to the external device or to increase the supply power W. Furthermore, for example, when a new connection of an external device to the USB connecting unit 19 is detected after the start of the system, the CPU 12 performs negotiation to supply electric power to or receive electric power from the newly connected external device. The CPU 12 supplies the supply power W to the newly connected external device, in response to a result of the negotiation. In this manner, the MFP 1 can supply the supply power W to a plurality of external devices connected to the USB connecting unit 19. The CPU 12 starts the power amount control illustrated in FIGS. 2 and 3 in a state in which the supply power W is supplied to each of the plurality of external devices.

First, in step (hereinafter, simply referred to as "S") 11 in FIG. 2, the CPU 12 determines whether the amount of the supply power W supplied to a plurality of external devices can be maintained. In a state in which the supply power W is supplied, there is a possibility that the MFP 1 becomes power shortage, for example, when a print job received from the laptop 34 which is an external device is executed at the image forming unit 16. Furthermore, there is a possibility that the electric power of the MFP 1 becomes power shortage due to the execution of the copying function, the scanner function, the FAX function, or the like. As a result, a total amount of the supply power W that can be supplied by the MFP 1, that is, a total amount of electric power becomes less than the sum of the amounts of electric power that are being supplied to the plurality of external devices. The CPU 12 determines that the total amount of the supply power W supplied to the plurality of external devices can be maintained until the total amount of the supply power W that can be supplied becomes less than the sum of the amounts of electric power supplied to the plurality of external devices (S11: NO). In this case, the CPU 12 repeatedly performs the determination process of S11, for example, at predetermined time intervals. The step S11 is an example of processing of "determining whether the power of the power supply in the information processing apparatus is sufficient." The processing in the case of "S11 NO" is an example of processing of "detecting power shortage of the information processing apparatus."

On the other hand, when the total amount of the supply power W that can be supplied becomes less than the sum the amounts of electric power supplied to the plurality of external devices, the CPU 12 determines that the total amount of the supply power W supplied to the plurality of external devices cannot be maintained (S11: YES), and thus, performs S13. In S13, the CPU 12 obtains the battery information 152 of all the external devices connected to the USB connecting unit 19. The CPU 12 temporarily stores the obtained battery information 152 in the NVRAM 15 (see FIG. 1). The battery information 152 is information indicating whether an external device has a battery. In addition, the CPU 12 obtains information indicating a usage status of a battery (such as the battery 31A) of an external device as the battery information 152. The information indicating the usage status is, for example, information indicating whether the battery is in a charging state in which the battery is being charged, a discharging state in which electric power of the battery is being used, or an idle state (a natural discharging state) in which the battery is not in use. The CPU 12 can obtain the battery information 152 described above, for example, through the execution of communications according to the USB PD standard with external devices.

When S13 is performed, the CPU 12 determines whether there is an external device having no battery out of the external devices connected to the USB connecting unit 19 based on the obtained battery information (S15). When it is determined that there is an external device having no battery (S15: YES), the CPU 12 reduces the supply power W supplied to the external device having no battery (S17). As illustrated in FIG. 1, in the present embodiment, as an external device having no battery, the display 32 is connected to the USB connecting unit 19. Thus, the CPU 12 reduces the supply power W supplied to the display 32 based on the battery information obtained in S13. For example, the CPU 12 reduces the amount of the supply power W supplied to the display 32 up to 2.5 W which is the minimum power level in the initial state. As a result, the CPU 12 secures electric power corresponding to the reduced portion of the supply power W. In the present application, the reduction of the supply power W is a concept including not only the reduction of the supply power W but also the complete stoppage of supply of the supply power W. For example, in S17, the CPU 12 may stop the supply power W supplied to the display 32. Accordingly, the CPU 12 can secure electric power by stopping the supply to the display 32.

In the present embodiment, "the reduction of the supply power W supplied to the external device" includes "after notifying the external device that the supply power W will be reduced via a USB interface, reducing the supply power W supplied to the external device." The above notification to the external device includes, for example, "an indication of an amount of power smaller than the amount of the supply power being supplied to the external device as an amount of the supply power that can be supplied." For example, in S17, the CPU 12 notifies the external device (the display 32) having no battery that the supply power will be reduce via the USB receptacle 191. Afterward, the CPU 12 reduces the supply power W supplied to the display 32 when a predetermine time has elapsed or when the CPU 12 has received a notification of an acceptance from the display 32 via the receptacle 191.

Thus, the CPU 12 according to the present embodiment reduces the supply power W supplied to the external device having no battery (S17). In other words, the CPU 12 of the present embodiment maintains the supply power W supplied to an external device having a battery (an example of maintenance processing).

After S17 is performed, the CPU 12 performs S19. When it is determined in S15 that there is no external device having no battery (S15: NO), the CPU 12 performs S19. In S19, the CPU 12 reduces the supply power W supplied to an external device that has a battery and is not charging the battery, based on the battery information obtained in S13. As illustrated in FIG. 1, in the present embodiment, as external devices having a battery, three external devices such as the smartphone 31, the external hard disk 33, and the laptop 34, are connected to the USB connecting unit 19. Thus, the CPU 12 reduces the amount of the supply power W of the external device that is not charging the battery among the three external devices, to the minimum power level in the initial state based on the battery information 152 obtained in S13. A state in which a battery is not being charged is, for example, a discharging state in which electric power of the battery is being used or an idle state in which the battery is not in use. As a result, the CPU 12 can maintain the supply power W supplied to an external device that is being charged while securing the electric power by reducing the supply power W. In addition, in S19, the CPU 12 may completely stop the supply of the supply power W rather than reducing the supply power W supplied to the external device that is not being charged.

Accordingly, the CPU 12 according to the present embodiment reduces the supply power W supplied to an external device that has a battery and is not charging the battery (S17). In other words, the CPU 12 of the present embodiment maintains the supply power W supplied to the external device that is charging the battery (an example of maintenance processing).

After S19 is performed, the CPU 12 performs S21. The CPU 12 secures electric power through the reduction of the supply power W in S17 and S19, thereby supplementing the insufficient electric power determined in S11. However, the MFP 1 may become power shortage even when S17 and S19 are performed. Therefore, in S21, the CPU 12 determines whether the total amount of the supply power W supplied to the external devices after the reduction of the supply power W can be maintained. That is, the CPU 12 determines whether necessary electric power can be secured and thus it is unnecessary to further reduce the supply power W.

When the total amount of the supply power W that can be supplied after the reduction of the supply power W becomes greater than or equal to the sum of the amounts of electric power supplied to the plurality of external devices, the CPU 12 determines that the total amount of the supply power W supplied to the external devices can be maintained (S21: NO), and ends the power amount control illustrated in FIGS. 2 and 3. In this case, the insufficient power determined in S11 can be supplemented through the reduction of the supply power W in S17 or S19 and thus the CPU 12 ends the power amount control.

On the other hand, when the total amount of the supply power W that can be supplied after the reduction of the supply power W is less than the sum of the amounts of electric power supplied to the plurality of external devices, the CPU 12 determines that the total amount of the supply power W supplied to the external devices cannot be maintained (S21: YES), and performs S23. By performing S17 and S19, the supply power W supplied to an external device having no battery or an external device that has a battery but is not charging the battery is reduced to the initial state. Accordingly, when it is determined in S21 that necessary electric power cannot be secured (S21: YES), the CPU 12 reduces the supply power W supplied to an external device that is charging a battery and the like.

More specifically, in S23, the CPU 12 obtains a vendor ID, a product ID, and a battery charged level of an external device that is charging a battery. The CPU 12 can obtain the vender ID or the like, for example, by performing communications with the external device according to the USB PD standard. The vender ID is information capable of identifying the manufacturer of the external device. The product ID is information such as a manufacturing number given by the manufacturer of the external device. Thus, the vender ID and the product ID are information capable of identifying an external device from another external device. The battery charged level refers to a state of charge of the battery of the external device being charged. Information identifying an external device is not limited to the vendor ID and the product ID, and may be other information. Alternatively, the CPU 12 may perform the process of obtaining the vendor ID, or the like in S23 at another timing, for example, when S13 of obtaining the battery information 152 is performed.

After S23 is performed, the CPU 12 performs S25. In S25, the CPU 12 generates the residual amount information 153 which associates the vender ID, the product ID, and the battery charged level, and temporarily stores the generated residual amount information 153 in the NVRAM 15 (see FIG. 1). FIG. 4 illustrates an example of the content of the residual amount information 153. As illustrated in FIG. 4, in each row of the residual amount information 153, a vender ID, a product ID, and a battery charged level are stored in associated with one another.

In the residual amount information 153, job reception information which is information regarding the reception of a job related to image processing is stored in association with other information. Here, the job related to image processing is, for example, a job that causes the MFP 1 to execute the processing of the image data 155. Examples of the job related to image processing include a print job that causes the image forming unit 16 to perform printing. For example, the CPU 12 causes the image forming unit 16 to print the image data 155 based on a print job received from the laptop 34 (see FIG. 1). Alternatively, the job related to image processing is, for example, a scan command job instructing the image reading unit 17 to read a document and generate the image data 155. Alternatively, the job related to image processing is, for example, a job commanding the FAX communication unit 18 to transmit the image data 155 or a job commanding the image forming unit 16 to print the image data 155 received by the FAX communication unit 18.

The content of the residual amount information 153 is not limited to the information illustrated in FIG. 4. For example, the residual amount information 153 may include information of a history of receiving jobs from an external device within a predetermined time period as the job reception information. In this case, from the job reception information of the residual amount information 153, the CPU 12 can identify not only an external device sending a job to the MFP 1 but also an external device sending no job to the MFP 1 based on the fact that a job has not been received from an external device, that is, there is no history of receiving a job from an external device within a predetermined period.

For example, when a job is received from an external device via the USB connecting unit 19 after the start of the system of the MFP 1, the CPU 12 temporarily stores information indicating the reception of the job in the NVRAM 15 in association with the vender ID, or the like. Thereafter, when above-described S25 is performed, the CPU 12 adds the job reception information to the residual amount information 153. Alternatively, the CPU 12 may delete the job reception information whenever the system is stopped or may store the job reception information only for a certain time period.

Furthermore, in the residual amount information 153, a value of the supply power W supplied to each external device is stored in association with the vender ID, or the like. In addition, in the residual amount information 153, port information allowing to identify a connection port for connection of an external device is stored in association with the vender ID, or the like. Based on the residual amount information 153, the CPU 12 can quickly perform a process of reducing the supply power W after S27 which will be described later. The content of the residual amount information 153 illustrated in FIG. 4 is merely an example and may be appropriately changed. For example, the residual amount information 153 may not include the information regarding the connection port.

Figure 3:
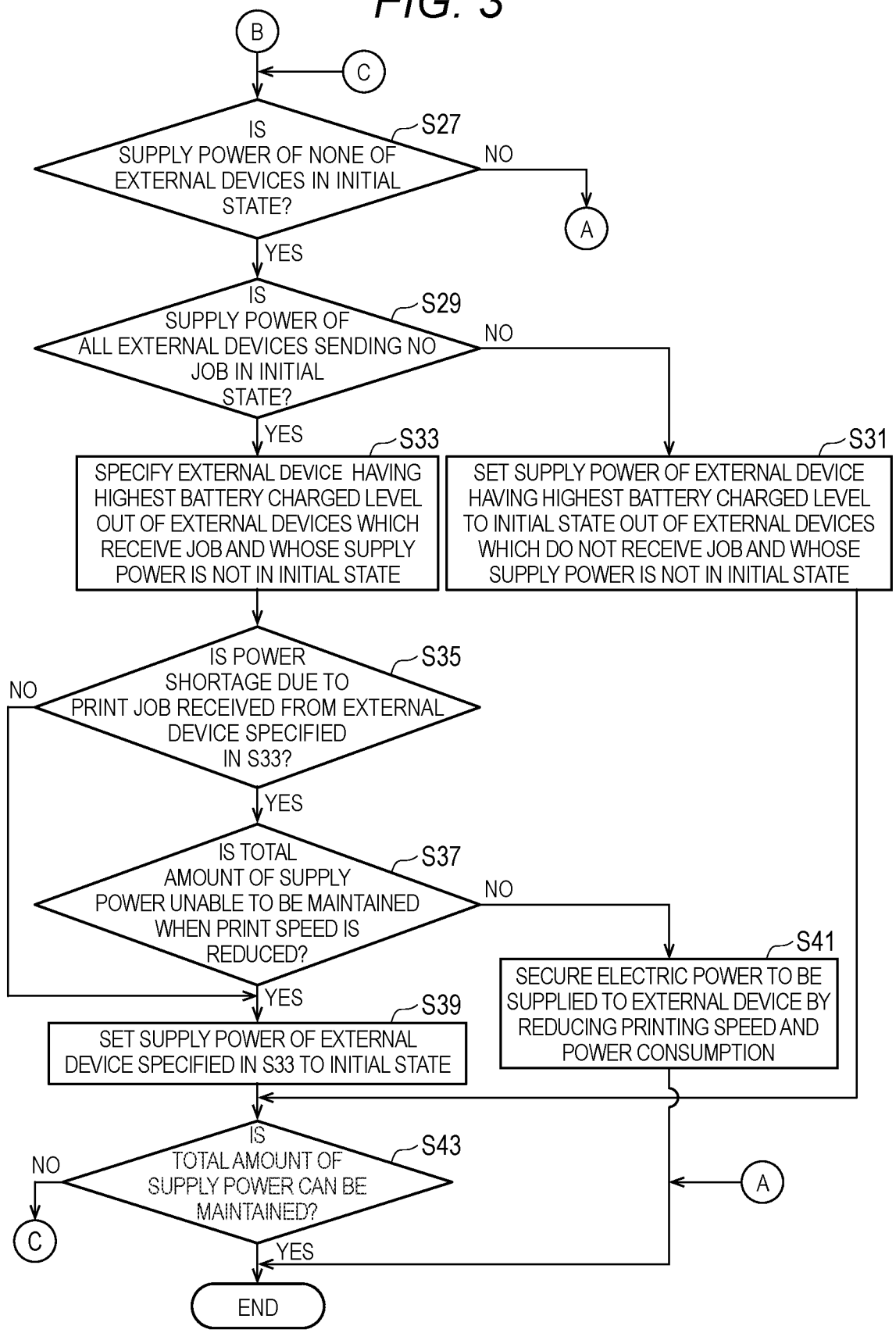
FIG. 3 is a flowchart illustrating the content of the power amount control process.

After S25 is performed, the CPU 12 performs S27 illustrated in FIG. 3. In S27, the CPU 12 determines whether the supply power W supplied to all the connected external devices is in the initial state. That is, the CPU 12 determines whether the supply power W supplied to all the external devices has been reduced to the minimum power level in the initial state. When it is determined that the supply power W supplied to all the connected external device is in the initial state (S27: NO), the CPU 12 ends the power amount control illustrated in FIGS. 2 and 3. In this case, as will be described later, electric power cannot be secured even when the supply power W supplied to all the external devices including an external device that is being charged is reduced up to the initial state. Accordingly, the CPU 12 ends the power amount control. Alternatively, when it is determined that the supply power W supplied to all the external devices is in the initial state (S27: NO), the CPU 12 may sequentially stop the supply of the supply power W to each of the external devices to secure the electric power.

On the other hand, when it is determined that the supply power W of all the connected external devices is not in the initial state (S27: YES), the CPU 12 determines whether the supply power W supplied to all external devices sending no job to the MFP 1 is in the initial state (S29). The CPU 12 can determine whether the supply power W of all the external devices sending no job is in the initial state by detecting external devices sending no job based on the job reception information of the residual amount information 153 and determining whether the supply power W supplied to the detected external devices is in the minimum power level (S29). When it is determined that the supply power W of all the external devices sending no job is not in the initial state (S29: NO), the CPU 12 sets the supply power W of an external device having a highest battery charged level to the initial state out of the external devices which do not receive a job and whose supply power W is not in the initial state.

For example, that a job is being received from an arbitrary external device NO. 1 means that the job received from the external device NO. 1 is being performed. In other words, that the job is not received from the external device NO. 1 means that the job received from the external device NO. 1 is not performed. For example, that a print job received from the external device No. 1 is being performed indicates that processes 1 to 3 which will be described below are being performed. In other words, the MFP 1 does not perform the job received from the external device NO. 1 when all of the processes 1 to 3 which will be described below are completed and a new print job is not received from the external device NO. 1. Process 1: the MFP 1 is sequentially receiving a print job from the external device NO. 1. Process 2: image data related to the received print job is developed. Process 3: an image related to the received print job is printed on a sheet (printing).

For example, a scan command job (scan job) received from an arbitrary external device NO. 1 is being performed indicates that processes 4 and 5 which will be described below are being performed. In other words, the MFP 1 does not perform the job received from the external device NO. 1 when both the processes 4 and 5 which will be described below are completed and a new scan job is not received from the external device No. 1. Process 4; the MFP 1 is receiving the scan job from the external device No. 1. Process 5: image data read from a document is sequentially transmitted to the external device No. 1.

In the example illustrated in FIG. 4, a job is not received from external devices NO. 2 and NO. 3. A battery charged level of the external device NO. 2 is 60%, and a battery charged level of the external device No. 3 is 70%. Thus, in S31, the CPU 12 secures electric power by setting the supply power W supplied to the external device No. 3 having a higher battery charged level to the initial state. In this case, the CPU 12 can easily specify a port connected to the external device No. 3 by using the information regarding the connection port of the residual amount information 153, and can quickly start negotiation to set the supply power W to an initial state. In S31, the CPU 12 may set the supply power W of an external device sending no job to zero instead of the initial state. The "NO" illustrated in the leftmost side of FIG. 4 is merely a number assigned for convenience of explanation, and is information that does not need to be stored as the residual amount information 153.

After S31 is performed, the CPU 12 performs S43. When S31 is performed, there is a possibility that the CPU 12 can supplement insufficient electric power. Therefore, in S43, the CPU 12 determines whether the amount (total amount) of the supply power W supplied to the external devices can be maintained. When it is determined that the amount (total amount) of the supply power W supplied to the external devices can be maintained (S43: YES), the CPU 12 ends the power amount control illustrated FIGS. 2 and 3.

On the other hand, when it is determined that the total amount of the supply power W supplied to the external devices cannot be maintained (S43: NO), the CPU 12 performs S27 again. In the example illustrated in FIG. 4, there are two external devices that do not receive a job. Thus, when the CPU 12 performs S29 again, and when it is determined that the supply power W supplied to all the external devices sending no job is not in the initial state (S29: NO), the CPU 12 performs S31 secondarily. When S31 is performed secondarily, the CPU 12 sets the supply power W supplied to the external device NO. 2 illustrated in FIG. 4 to the initial state. In this manner, the CPU 12 according to the present embodiment preferentially reduces the supply power W supplied to the external device having a highest battery charged level out of the plurality of external devices, as compared with the supply power W supplied to the other external devices.

By performing S31 twice, the supply power W of all the external devices sending no job is set to the initial state. Thus, if the electric power is not secured (S43: NO) and S29 is performed thirdly, the CPU 12 determines that the supply power W of all the external devices sending no job is in the initial state (S29: YES), and performs S33. In S33, based on the residual amount information 153, the CPU 12 specifies an external device having a highest battery charged level out of external devices which receive a job and whose supply power W is not in the initial state. In the example illustrated in FIG. 4, only the external device NO. 1 corresponds to an external device sending a job, and thus, in S33, the CPU 12 specifies the external device NO. 1 as a target external device. When there are a plurality of external devices sending a job, the CPU 12 can quickly specify a target external device by searching for an external device whose supply power W is not in the initial state (minimum power level) and which receives a job and has a highest battery charged level out of the external devices specified in the residual amount information 153.

After S33 is performed, the CPU 12 performs S35. In S35, the CPU 12 determines whether power shortage is due to a print job received from the external device specified in S33. For example, when the print job received from the external device specified in S33 is being performed by the image forming unit 16, the CPU 12 determines that the power shortage is due to the print job received from the external device specified in S33 (S35: YES).

When it is determined that the power shortage is due to the print job received from the external device specified in S33 (S35: YES), the CPU 12 performs S37. In S37, the CPU 12 determines whether the amount (total amount) of the supply power W supplied to the external devices can be maintained by reducing the speed of printing that is being performed to half a normal printing speed, that is, by reducing the printing speed of the print job received from the external device specified in S33 to be slow. Thus, the CPU 12 attempts to secure electric power by reducing the printing speed when a print job is received from the external device having a highest battery charged level out of the external devices whose supply power W is not in the initial state and is being executed. For example, the MFP 1 can reduce power consumption related to a printing process by decreasing a rotational speed of a motor, which is a driving source for conveying a sheet in the printing process, to reduce a sheet conveyance speed, that is, the printing speed. For example, the value of the amount of electric power that can be secured by reducing power consumption when the printing speed is reduced from the normal printing speed to a low speed is stored in the ROM 14. When the value of the amount of electric power that can be secured, which is stored in the ROM 14, is greater than or equal to the amount of insufficient portion of electric power, the CPU 12 determines that the amount of the supply power W supplied to the external devices can be maintained by reducing the speed of printing that is being executed to a low speed (S37: NO).

When it is determined that the total amount of the supply power W supplied to the external devices can be maintained (S37: NO), the CPU 12 secures electric power supplied to the external devices by reducing the speed of printing that is being executed and reducing power consumption (S41). In this case, since the insufficient portion of electric power can be secured by reducing the printing speed, the CPU 12 ends the power amount control illustrated in FIGS. 2 and 3.

On the other hand, when it is determined in S37 that the total amount of the supply power W supplied to the external devices cannot be maintained even after reducing the speed of printing (S37: YES), the CPU 12 performs S39. When it is determined in the above-described S35 that the power shortage is not due to the print job received from the external device specified in S33 (S35: NO), the CPU 12 performs S39. In S39, the CPU 12 sets the supply power W of the external device specified in S33, that is, the external device having a highest battery charged level to the initial state out of the external devices which receive a job and whose supply power W is not in the initial state.

Thus, when it is determined that electric power can be secured by reducing the printing speed of the print job of the external device that is specified in S33 and is being charged (S37: NO), the CPU 12 of the present embodiment preferentially reduces the printing speed without reducing the supply power W (S39). Accordingly, the supply of electric power to the external device that is being charged can be maintained by reducing the printing speed. The printing speed after the reduction of the printing speed and the power consumption in S41 is not limited to half the printing speed before the reduction of the printing speed and the power consumption, and may be ⅓ or ¼ of the printing speed before the reduction of the printing speed and the power consumption.

In S35, the CPU 12 determines whether the power shortage is due to the print job received from the external device specified in S33, but the present disclosure is not limited thereto. For example, when a scan command job or a FAX command job is received from the external device specified in S33 and is being executed, the CPU 12 may secure electric power by reducing power consumption in a scan operation or a FAX operation that is being executed.

After S39 is performed, the CPU 12 executes S43 and determines whether the insufficient portion of electric power can be supplemented by reducing the supply power W of the external device sending the job. When it is determined that the electric power cannot be secured (S43: NO), the CPU 12 performs S27. Then, when it is determined that the electric power cannot be secured even after the supply power W of all the external devices, including the external device that is being charged, is set to the initial state (S27: NO), the CPU 12 ends the power amount control illustrated in FIGS. 2 and 3. On the contrary, when there is another external device whose battery is being charged, which has received a job, and whose supply power W is not in the initial state (S27: YES), the CPU 12 performs processes subsequent to S29 with respect to the another external device. In this way, the CPU 12 reduces the supply power W and secures electric power.

In addition, the MFP 1 is an example of an information processing apparatus. The CPU 12 is an example of a controller. The image forming unit 16 is an example of an image processor. The smartphone 31, the display 32, the external hard disk 33, and the laptop 34 are examples of external devices.

(3. Effect)

As described above, according to the above-described embodiment, the following effects are obtained.

(1) The MFP 1 of the present embodiment includes the power source 27, the USB connecting unit 19 connected to the power source 27 and connected to the plurality of external devices (the smartphone 31, and the like), respectively, through a connection according to the USB PD standard, and the CPU 12. The CPU 12 performs a battery information obtaining process (S13) of obtaining the battery information 152 including information as to whether each of the external devices has a battery (such as the battery 31A), a maintenance determination process (S11) of determining whether the total amount of electric power (the supply power W) supplied to each of the external devices via the USB connecting unit 19 is maintained, and a first reduction process (S17) of reducing the supply power W supplied to external devices having no battery out of the external devices based on battery information 152, when it is determined in the maintenance determination process that the total amount of electric power supplied to the external devices cannot be maintained (S11:YES).

As a result, when the total amount of the supply power W supplied to each of the plurality of external devices cannot be maintained, the CPU 12 reduces the supply power W of external devices having no battery. There is a possibility that an external device (such as the smartphone 31) having a battery serving as a power supply is driven by the battery or is charging the battery. Thus, there is a high possibility that the external device having a battery needs more electric power, as compared with an external device (the display 32) that does not have a battery. Accordingly, the CPU 12 can reduce the amount of the supply power W supplied from the USB connecting unit 19 by reducing the supply power W of the external device having no battery.

Here, for example, if an external device includes a nickel hydrogen battery as a battery, when supplementary charging is performed after a battery charged level decreases due to natural discharge, a phenomenon called a memory effect occurs, thereby causing a voltage drop to occur. When the supply power W supplied to an external device is reduced during the charging of the external device including the nickel hydrogen battery, the external device may have power shortage and thus supplementary charging is likely to be performed. On the other hand, the CPU 12 of the present embodiment is capable of preventing the occurrence of the memory effect in external devices by reducing the supply power W of an external device having no battery.

(2) When it is determined in the maintenance determination process (S11) that the total amount of electric power supplied to the external devices cannot be maintained, the CPU 12 performs the maintenance process of maintaining the supply power W supplied to an external device having a battery out of the plurality of external devices on the basis of the battery information 152 (S15: NO).

In this case, the supply of electric power to an external device having a battery can be prioritized than the supply of electric power to an external device having no battery.

(3) The battery information 152 includes information indicating whether each of the external devices is charging a battery. When it is determined in the maintenance determination process that the total amount of electric power supplied to the external devices cannot be maintained (S11: YES), the CPU 12 performs the maintenance process of maintaining the supply power W supplied to an external device that has the battery and is charging the battery based on the battery information 152 (S19).

An external device that is charging a battery is highly likely to need more electric power than an external device that is not charging a battery. Thus, the CPU 12 maintains the supply of electric power to the external device that is charging the battery. Accordingly, the supply of electric power to an external device having a higher necessity of supply of electric power out of the external devices having a battery can be maintained as much as possible.

(4) The CPU 12 performs a second reduction process (S19) of reducing the supply power W supplied to an external device that has the battery and is not charging the battery based on the battery information 152.

Accordingly, the amount of power to be supplied from the USB connecting unit 19 may be reduced by reducing the supply power W supplied to an external device that is not charging the battery.

(5) Furthermore, the CPU 12 performs a residual amount information storing process (S25) of storing the residual amount information 153 associating a battery charged level indicating a state of charge of the battery of each of the external devices with identification information, identifying each of the external devices (product ID and the like). The CPU 12 performs a third reduction process (S33, S39, and S31) of determining an external device, to which supply power W is reduced to be supplied, out of the external devices based on the battery charged level in the residual amount information 153 to reduce the supply power W of the determined external device.

Through these processes, the CPU 12 can store the residual amount information 153 associating the battery charged level with the product ID and the like, and determines a reduction target external device based on the battery charged level of the residual amount information 153. Accordingly, a reduction target external device can be quickly determined out of the plurality of external devices by preparing the residual amount information 153 in advance.

(6) In the third reduction process (S33, S39, and S31), the CPU 12 preferentially reduces the supply power W supplied to an external device having a highest battery charged level out of the external devices, as compared with the supply power W supplied to the other external devices.

An external device having a low battery charged level, even when the external device is being charged, is highly likely to need more electric power than an external device having a high battery charged level. Thus, the CPU 12 can maintain the supply power supplied to the external device having a higher necessity of supply of electric power as much as possible by preferentially reducing the supply power W supplied to the external device having the highest battery charged level.

(7) The MFP 1 further includes the image forming unit 16 for executing a print job related to image processing. In the third reduction process, the CPU 12 preferentially reduces the supply power W supplied to an external device, which sends no print job to the image forming unit 16, out of the external devices, as compared to the supply power W supplied to an external device sending the print job (S29).

In S29, the CPU 12 prioritizes supply of electric power to an external device that actually sends a print job and performs an interaction related to image processing. Thus, when the supply power W is reduced, the supply power W supplied to an external device that is highly likely to request to perform the print job can be maintained as much as possible.

(4. Modified Example)

The present application is not limited to the above-described embodiment, and various improvements and modifications may be made without departing from the spirit of the present disclosure.

For example, the CPU 12 may perform S13 of obtaining the battery information 152 before S11.

In the present application, the USB standard is not limited to the USB PD standard, and other standards capable of changing supply power through negotiation may be used.

The CPU 12 reduces the supply power W of an external device that is not charging a battery and maintains the supply power W of an external device that is charging a battery (S19), but this process may not be performed. Furthermore, the CPU 12 determines an external device whose supply power W is to be reduced, according to the battery charged level (S31 and S33), but this process may not be performed. In addition, the CPU 12 determines an external device whose supply power W is to be supplied, according to whether the external device has received a job (S29), but this process may not be executed. For example, for power amount control, the CPU 12 may perform only S11, S13, S15, and S17 to maintain the supply of the supply power W to an external device having a battery and to reduce the supply power W of an external device having no battery.

A printing method of the image forming unit 16 is not limited to the ink jet method, and may be an electrophotographic method or a thermal method. For example, in the case of the electrophotographic method, the image forming unit 16 may include a photosensitive drum, a developing roller for supplying toner to the photosensitive drum, an exposing device for exposing the photosensitive drum, a toner cartridge for containing toner, and the like.

The MFP 1 may receive a job related to the formation of an image via a network, such as a LAN, instead of via the USB connecting unit 19.

The destination at which the control program 151 is stored is not limited to the ROM 14, and may be another computer readable recording medium, such as a RAM, a hard disk, a CD-ROM, a DVD-ROM, or the like.

In the above embodiment, the external device having the battery is explained as the smartphone 31, the external hard disk 33, and the laptop 34, but the present disclosure is not limited thereto. For example, the external device having the battery may be a camera or a mobile printer.

In the above embodiment, the external device having no battery is explained as the display 32, but the present disclosure is not limited thereto. For example, the external device having no battery may be a luminaire, a fan, a heater, or a speaker.

In the above embodiment, the CPU 12 is employed as a controller of the present application, but the present disclosure is not limited thereto. For example, the controller may be configured with dedicated hardware such as an application specific integrated circuit (ASIC). Alternatively, the controller may be configured to be operated, for example, using both software processing and hardware processing.

In the above-described embodiments, the MFP 1 which is a multifunction peripheral is employed as an information processing apparatus of the present application but the present disclosure is not limited thereto. The information processing apparatus of the present application may be a printer apparatus, a copying apparatus, a facsimile apparatus, a scanner apparatus, or a camera.

What is claimed is:

1. An information processing apparatus comprising:
    a power supply;
    a plurality of interfaces including a first interface; and
    a controller configured to:
    receive first battery information from a first external device via the first interface, the first battery information including information indicating whether the first external device has a battery;
    determine whether a total amount of electric power supplied to the plurality of the interfaces from the power supply is maintained; and
    in response to determining that the total amount of the electric power supplied to the plurality of the interfaces from the power supply is not maintained, reduce an amount of the electric power supplied to the first external device via the first interface in a case where determining that the first external device has no battery based on the first battery information.

2. The information processing apparatus according to claim 1,
    wherein the plurality of interfaces further includes a second interface, and
    wherein the controller is configured to:
    receive second battery information from a second external device via the second interface, the second battery information including information indicating whether the second external device has a battery; and
    regardless of the determination that the total amount of the electric power supplied to the plurality of the interfaces from the power supply is not maintained, maintain an amount of the electric power supplied to the second external device via the second interface in a case where determining that second external device has the battery based on the second battery information.

3. The information processing apparatus according to claim 1,
    wherein the plurality of interfaces further includes a second interface, and
    wherein the controller is configured to:
    receive second battery information from a second external device via the second interface, the second battery information including information indicating whether the second external device has a battery and information indicating whether the second external device is charging the battery; and
    in response to determining that the total amount of the electric power supplied to the plurality of the interfaces from the power supply is not maintained, reduce an amount of the electric power supplied to the second external device via the second interface in a case where determining that the second external device has the battery and is not charging the battery based on the second battery information.

4. The information processing apparatus according to claim 3,
wherein the controller is configured to:
regardless of the determination that the total amount of the electric power supplied to the plurality of the interfaces from the power supply is not maintained, maintain an amount of the electric power supplied to the second external device via the second interface in a case where determining that second external device is charging the battery based on the second battery information.

5. The information processing apparatus according to claim 2, further comprising:
a memory; and
a print engine,
wherein the controller configured to:
in response to receiving a print job, print an image on a sheet by the print engine;
in response to receiving the print job, store a record corresponding to the received print job in the memory; and
in response to determining that the total amount of the electric power supplied to the plurality of the interfaces from the power supply is not maintained, reduce an amount of the electric power supplied to the second external device via the second interface in a case where determining that the record corresponding to the second interface is not stored in the memory.

6. The information processing apparatus according to claim 5,
wherein the controller is configured to:
regardless of the determination that the total amount of the electric power supplied to the plurality of the interfaces from the power supply is not maintained, maintain an amount of the electric power supplied to the second external device via the second interface in a case where determining that the record corresponding to the second interface is stored in the memory.

7. The information processing apparatus according to claim 2, further comprising:
a memory; and
a scan engine,
wherein the controller configured to:
in response to receiving a scan job, scan an image from a document by the scan engine;
in response to receiving the scan job, store a record corresponding to the received scan job in the memory; and
in response to determining that the total amount of the electric power supplied to the plurality of the interfaces from the power supply is not maintained, reduce an amount of the electric power supplied to the second external device via the second interface in a case where determining that the record corresponding to the second interface is not stored in the memory.

8. The information processing apparatus according to claim 7,
wherein the controller is configured to:
regardless of the determination that the total amount of the electric power supplied to the plurality of the interfaces from the power supply is not maintained, maintain an amount of the electric power supplied to the second external device via the second interface in a case where determining that the record corresponding to the second interface is stored in the memory.

9. The information processing apparatus according to claim 1,
wherein each of the plurality of the interface is a USB (Universal Serial Bus) interface.

10. An information processing apparatus comprising:
a power supply;
a plurality of interfaces including a first interface; and
a controller configured to:
receive first battery information from a first external device via the first interface, the first battery information including information indicating whether the first external device has a battery and information indicating whether the first external device is charging the battery;
determine whether a total amount of electric power supplied to the plurality of the interfaces from the power supply is maintained; and
in response to determining that the total amount of the electric power supplied to the plurality of the interfaces from the power supply is not maintained, reduce an amount of the electric power supplied to the first external device via the first interface in a case where determining that the first external device has the battery and is not charging the battery based on the first battery information.

11. The information processing apparatus according to claim 10,
wherein the plurality of interfaces further includes a second interface, wherein the controller is configured to:
receive second battery information from a second external device via the second interface, the second battery information including information indicating whether the second external device has a battery and information indicating whether the second external device is charging the battery; and
regardless of the determination that the total amount of the electric power supplied to the plurality of the interfaces from the power supply is not maintained, maintain an amount of the electric power supplied to the second external device via the second interface in a case where determining that second external device has the battery and is charging the battery based on the second battery information.

12. The information processing apparatus according to claim 10,
wherein each of the plurality of the interface is a USB (Universal Serial Bus) interface.

13. An information processing apparatus comprising:
a power supply;
an interface; and
a controller configured to:
receive battery information from an external device via the interface, the battery information including information indicating whether the external device has a battery and information indicating whether the external device is charging the battery; and
in response to detecting power shortage of the power supply, reduce an amount of the electric power supplied to the external device via the interface in a case where determining that the external device has the battery and is not charging the battery based on the battery information.

14. The information processing apparatus according to claim 13,
wherein the controller is configured to:
regardless of the detecting of the power shortage of the power supply, maintain the amount of the electric power supplied to the external device via the interface in a case where determining that the external device has the battery and is charging the battery based on the battery information.

15. The information processing apparatus according to claim 13,
wherein the interface is a USB (Universal Serial Bus) interface.

16. A method of controlling an information processing apparatus including a power supply, a plurality of interfaces including a first interface, and a controller,
the method comprising the steps of:
receiving first battery information from a first external device via the first interface, the first battery information including information indicating whether the first external device has a battery;
determining whether a total amount of electric power supplied to the plurality of the interfaces from the power supply is maintained; and
in response to determining that the total amount of the electric power supplied to the plurality of the interfaces from the power supply is not maintained, reducing an amount of the electric power supplied to the first external device via the first interface in a case where determining that the first external device has no battery based on the first battery information.

17. A non-transitory computer-readable recording medium storing computer-readable instructions for an information processing apparatus comprising a power supply, a plurality of interfaces including a first interface, and a controller,
the computer-readable instructions, when executed by the controller, causing the information processing apparatus to perform:
receive first battery information from a first external device via the first interface, the first battery information including information indicating whether the first external device has a battery;
determine whether a total amount of electric power supplied to the plurality of the interfaces from the power supply is maintained; and
in response to determining that the total amount of the electric power supplied to the plurality of the interfaces from the power supply is not maintained, reduce an amount of the electric power supplied to the first external device via the first interface in a case where determining that the first external device has no battery based on the first battery information.

\* \* \* \* \*

UNITED STATES PATENT AND TRADEMARK OFFICE
CERTIFICATE OF CORRECTION

Page 1 of 1

PATENT NO. : 10,728,408 B2
APPLICATION NO. : 16/261652
DATED : July 28, 2020
INVENTOR(S) : Yasuhiro Shimamura et al.

It is certified that error appears in the above-identified patent and that said Letters Patent is hereby corrected as shown below:

On the Title Page

Item (54) and in the Specification, Column 1, Lines 1-9, should read:
INFORMATION PROCESSING APPARATUS HAVING AT LEAST ONE INTERFACE FOR ELECTRIC POWER TRANSFER, METHOD OF CONTROLLING INFORMATION PROCESSING APPARATUS TO TRANSFER ELECTRIC POWER TO AN EXTERNAL DEVICE, AND NON-TRANSITORY COMPUTER-READABLE RECORDING MEDIUM THEREFOR Signed and Sealed this
Twelfth Day of April, 2022

Drew Hirshfeld
*Performing the Functions and Duties of the*
*Under Secretary of Commerce for Intellectual Property and*
*Director of the United States Patent and Trademark Office*